US011881954B2

(12) United States Patent
Sun et al.

(10) Patent No.: US 11,881,954 B2
(45) Date of Patent: Jan. 23, 2024

(54) HYBRID AUTOMATIC REPEAT REQUEST CODEBOOK ENHANCEMENT FOR SIDELINK MODE 1

(71) Applicant: QUALCOMM Incorporated, San Diego, CA (US)

(72) Inventors: Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 218 days.

(21) Appl. No.: 17/445,447

(22) Filed: Aug. 19, 2021

(65) Prior Publication Data

US 2022/0103299 A1 Mar. 31, 2022

Related U.S. Application Data

(60) Provisional application No. 63/198,056, filed on Sep. 25, 2020.

(51) Int. Cl.
*H04L 1/1812* (2023.01)
*H04L 1/1867* (2023.01)
*H04L 1/08* (2006.01)

(52) U.S. Cl.
CPC ............... *H04L 1/189* (2013.01); *H04L 1/08* (2013.01); *H04L 1/1812* (2013.01); *H04L 1/1887* (2013.01)

(58) Field of Classification Search
CPC ..... H04L 1/189; H04L 1/1812; H04L 1/1887; H04L 1/08
See application file for complete search history.

(56) References Cited

U.S. PATENT DOCUMENTS

| 2020/0029318 | A1* | 1/2020 | Guo ....................... H04L 1/1822 |
| 2020/0106566 | A1* | 4/2020 | Yeo ........................ H04W 28/04 |
| 2021/0336728 | A1* | 10/2021 | Selvanesan ........... H04L 1/1861 |
| 2022/0007403 | A1* | 1/2022 | Li .......................... H04W 72/20 |
| 2022/0103300 | A1* | 3/2022 | Sun ....................... H04L 1/1896 |
| 2022/0103303 | A1* | 3/2022 | Sun ....................... H04L 1/1861 |

(Continued)

OTHER PUBLICATIONS

Apple: "Remaining Details on Mode 1 Resource Allocation", 3GPP Draft, 3GPP TSG RAN WG1 #100-e, R1-2000851, 3rd Generation Partnership Project (3GPP), Mobile Competence Centre, 650, Route Des Lucioles, F-06921 Sophia-Antipolis Cedex, France, vol. RAN WG1, No. e-Meeting, Feb. 24, 2020-Mar. 6, 2020, Feb. 15, 2020 (Feb. 15, 2020), XP051853469, 7 Pages, Retrieved from the Internet: URL: https://ftp.3gpp.org/tsg_ran/WG1_RL1/TSGR1_100_e/Docs/R1-2000851.zip. R1-2000851 Remaining Details on Mode 1 Resource Allocation.docx [Retrieved on Feb. 15, 2020], Subsubsection 2.3.1.

(Continued)

*Primary Examiner* — Kent Krueger
(74) *Attorney, Agent, or Firm* — Harrity & Harrity, LLP

(57) ABSTRACT

Various aspects of the present disclosure generally relate to wireless communication. In some aspects, a user equipment (UE) may receive downlink control information (DCI) indicating that the UE is to retransmit sidelink hybrid automatic repeat request (HARQ) feedback. The UE may retransmit the sidelink HARQ feedback on a physical uplink control channel for one or more sidelink HARQ processes based at least in part on the DCI. Numerous other aspects are provided.

30 Claims, 9 Drawing Sheets

(56) References Cited

U.S. PATENT DOCUMENTS

2022/0294570 A1* 9/2022 Hahn .................. H04L 5/0048
2022/0360950 A1* 11/2022 Li ....................... H04L 1/1812
2022/0400498 A1* 12/2022 Lee ..................... H04L 1/189
2022/0417976 A1* 12/2022 Park .................... H04L 5/0078

OTHER PUBLICATIONS

Asustek: "Discussion on Resource Allocation for Sidelink HARQ ACK/NACK Report", 3GPP Draft, 3GPP TSG-RAN WG2 Meeting #107bis, R2-1913769, Discussion on Resource Allocation for Sidelink HARQ ACK NACK Report, 3rd Generation Partnership Project (3GPP), Mobile Competence Centre, 650, Route Des Lucioles, F-06921 Soph, vol. RAN WG2, No. Chongqing, China, Oct. 14, 2019-Oct. 18, 2019, Oct. 4, 2019 (Oct. 4, 2019), XP051791760, 3 Pages, Retrieved from the Internet: URL: http://www.3gpp.org/ftp/tsg_ran/WG2_RL2/TSGR2_107bis/Docs/R2-1913769.zip. [retrieved on Oct. 4, 2019] p. 2.

Huawei, et al., "NR DCI and UCI Design for Resource Allocation Mode 1", 3GPP Draft, R1-1909315, 3GPP TSG RAN WG1 Meeting #98, 3rd Generation Partnership Project (3GPP), Mobile Competence Centre, 650, Route Des Lucioles, F-06921 Sophia-Antipolis Cedex, France vol. RAN WG1, No. Prague, Czech Republic, Aug. 26, 2019-Aug. 30, 2019, Aug. 17, 2019 (Aug. 17, 2019), XP051765922, 7 Pages, Retrieved from the Internet: URL:http://www.3gpp.org/ftp/tsg_ran/WG1_RL1/TSGR1_98/Docs/R1-1909315.zip [retrieved on Aug. 17, 2019] pp. 3-5, pp. 2-4.

International Search Report and Written Opinion—PCT/US2021/071241—ISA/EPO—dated Dec. 6, 2021.

* cited by examiner

HYBRID AUTOMATIC REPEAT REQUEST CODEBOOK ENHANCEMENT FOR SIDELINK MODE 1

CROSS-REFERENCE TO RELATED APPLICATION

This Patent Application claims priority to U.S. Provisional Patent Application No. 63/198,056, filed on Sep. 25, 2020, entitled "HYBRID AUTOMATIC REPEAT REQUEST CODEBOOK ENHANCEMENT FOR SIDELINK MODE 1," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for hybrid automatic repeat request codebook enhancement for sidelink mode 1.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, or a 5G Node B.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE, NR, and other radio access technologies.

SUMMARY

In some aspects, a method of wireless communication performed by a user equipment (UE) includes receiving downlink control information (DCI) indicating that the UE is to retransmit sidelink hybrid automatic repeat request (HARQ) feedback, and retransmitting the sidelink HARQ feedback on a physical uplink control channel (PUCCH) for one or more sidelink HARQ processes based at least in part on the DCI.

In some aspects, a method of wireless communication performed by a base station includes transmitting DCI, to a UE, indicating that the UE is to retransmit sidelink HARQ feedback after the sidelink HARQ feedback is dropped, and receiving the sidelink HARQ feedback on a PUCCH for one or more sidelink HARQ processes based at least in part on transmitting the DCI.

In some aspects, a UE for wireless communication includes a memory and one or more processors coupled to the memory, the one or more processors configured to receive DCI indicating that the UE is to retransmit sidelink HARQ feedback and retransmit the sidelink HARQ feedback on a PUCCH for one or more sidelink HARQ processes based at least in part on the DCI.

In some aspects, a base station for wireless communication includes a memory and one or more processors coupled to the memory, the one or more processors configured to transmit DCI, to a UE, indicating that the UE is to retransmit sidelink HARQ feedback after the sidelink HARQ feedback is dropped, and receive the sidelink HARQ feedback on a PUCCH for one or more sidelink HARQ processes based at least in part on transmitting the DCI.

In some aspects, a non-transitory computer-readable medium storing a set of instructions for wireless communication includes one or more instructions that, when executed by one or more processors of a UE, cause the UE to receive DCI indicating that the UE is to retransmit sidelink HARQ feedback and retransmit the sidelink HARQ feedback on a PUCCH for one or more sidelink HARQ processes based at least in part on the DCI.

In some aspects, a non-transitory computer-readable medium storing a set of instructions for wireless communication includes one or more instructions that, when executed by one or more processors of a base station, cause the base station to transmit DCI, to a UE, indicating that the UE is to retransmit sidelink HARQ feedback after the sidelink HARQ feedback is dropped, and receive the sidelink HARQ feedback on a PUCCH for one or more sidelink HARQ processes based at least in part on transmitting the DCI.

In some aspects, an apparatus for wireless communication includes means for receiving DCI indicating that the apparatus is to retransmit sidelink HARQ feedback and means for retransmitting the sidelink HARQ feedback on a PUCCH for one or more sidelink HARQ processes based at least in part on the DCI.

In some aspects, an apparatus for wireless communication includes means for transmitting DCI, to a UE, indicating that the UE is to retransmit sidelink HARQ feedback after the sidelink HARQ feedback is dropped, and means for receiving the sidelink HARQ feedback on a PUCCH for one or more sidelink HARQ processes based at least in part on transmitting the DCI.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
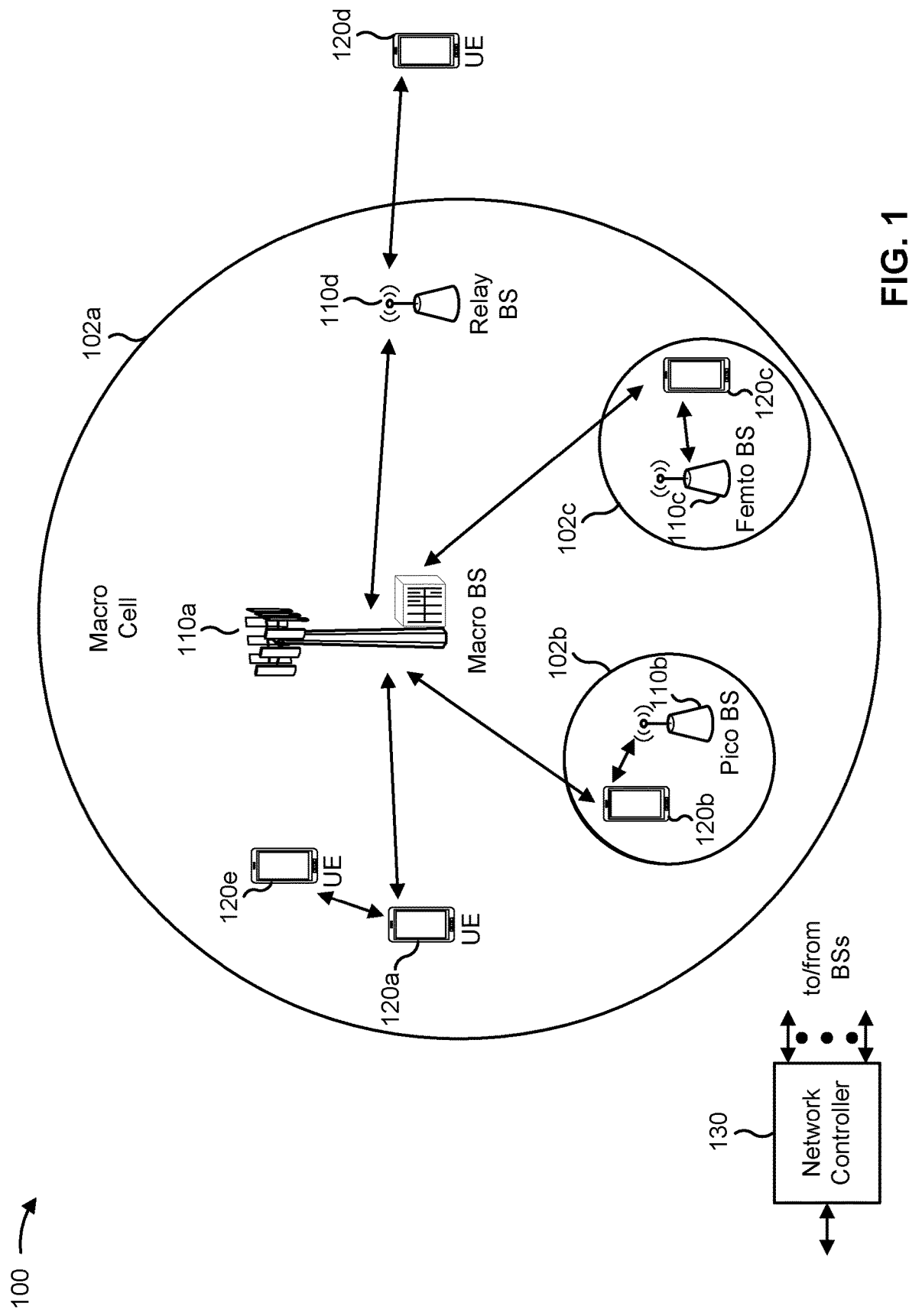
FIG. 1 is a diagram illustrating an example of a wireless network, in accordance with the present disclosure.

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-pedestrian (V2P) protocol, a vehicle-to-everything (V2X) protocol (e.g., which may include a vehicle-to-vehicle (V2V) protocol, or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
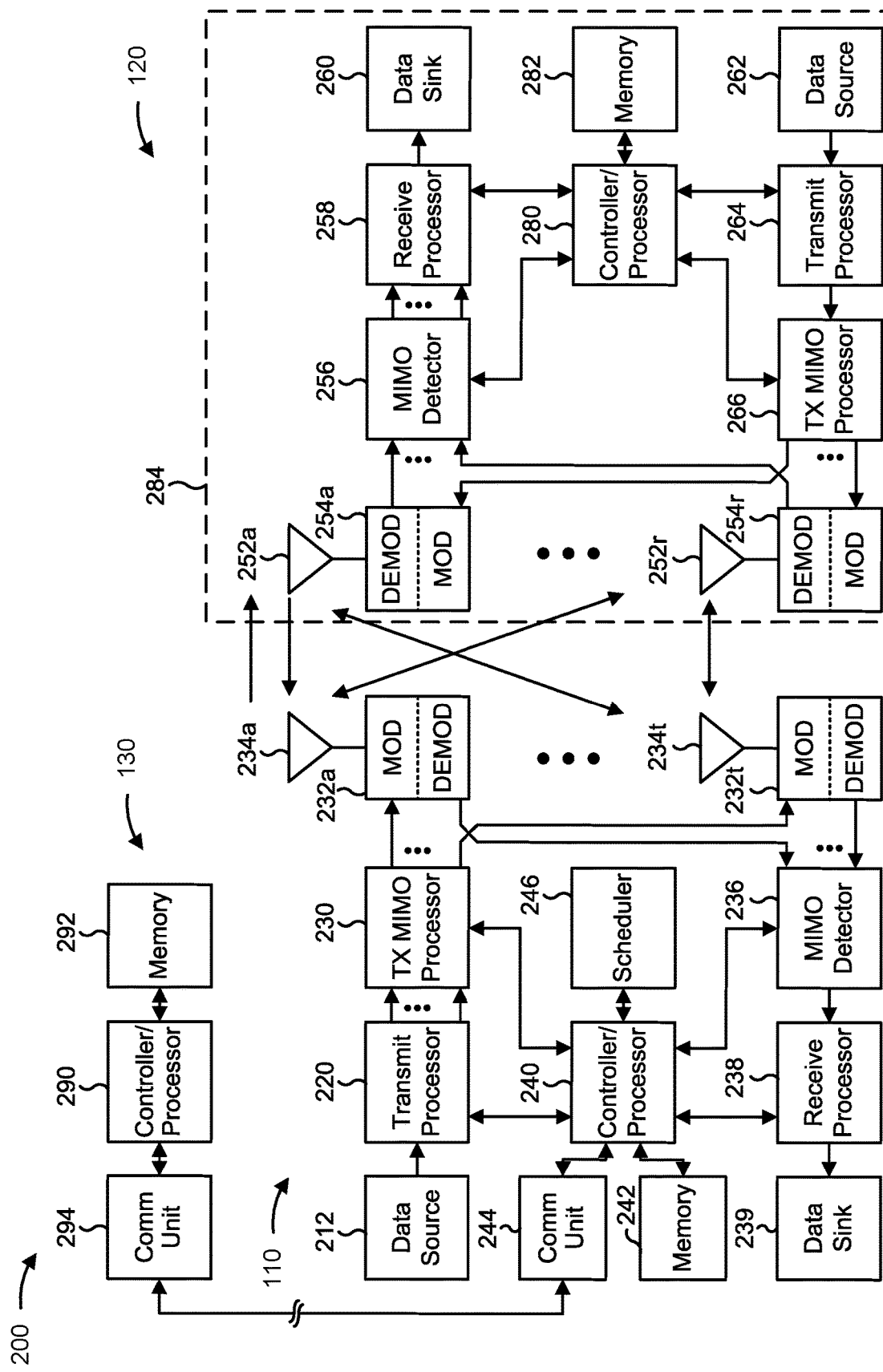
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), and/or CQI, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-9).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-9).

Controller/processor 240 of base station 110, controller/processor 280 of UE 120, and/or any other component(s) of FIG. 2 may perform one or more techniques associated with hybrid automatic repeat request (HARQ) codebook enhancement for sidelink mode 1, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of base station 110 and/or UE 120, may cause the one or more processors, UE 120, and/or base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, UE 120 includes means for receiving downlink control information (DCI) indicating that the UE is to retransmit sidelink HARQ feedback and/or means for retransmitting the sidelink HARQ feedback on a physical uplink control channel (PUCCH) for one or more sidelink HARQ processes based at least in part on the DCI. The means for UE 120 to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, UE 120 includes means for transmitting a new data indicator (NDI) for each corresponding sidelink HARQ process of the one or more sidelink HARQ processes.

In some aspects, base station 110 includes means for transmitting DCI, to a UE, indicating that the UE is to retransmit sidelink HARQ feedback after the sidelink HARQ feedback is dropped, and/or means for receiving the sidelink HARQ feedback on a PUCCH for one or more sidelink HARQ processes based at least in part on transmitting the DCI. The means for base station 110 to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, base station 110 includes means for transmitting, in a frequency domain resource assignment field in the DCI, a trigger for reporting only a type 3 codebook.

In some aspects, base station 110 includes means for transmitting a parameter for type 3 codebook control in a radio resource control message, wherein the parameter indicates that the UE is to transmit the sidelink HARQ feedback concatenated or multiplexed with HARQ feedback for a Uu interface in a type 3 codebook for the Uu interface, where receiving the sidelink HARQ feedback includes receiving the sidelink HARQ feedback concatenated or multiplexed with the HARQ feedback for the Uu interface in the type 3 codebook for the Uu interface.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
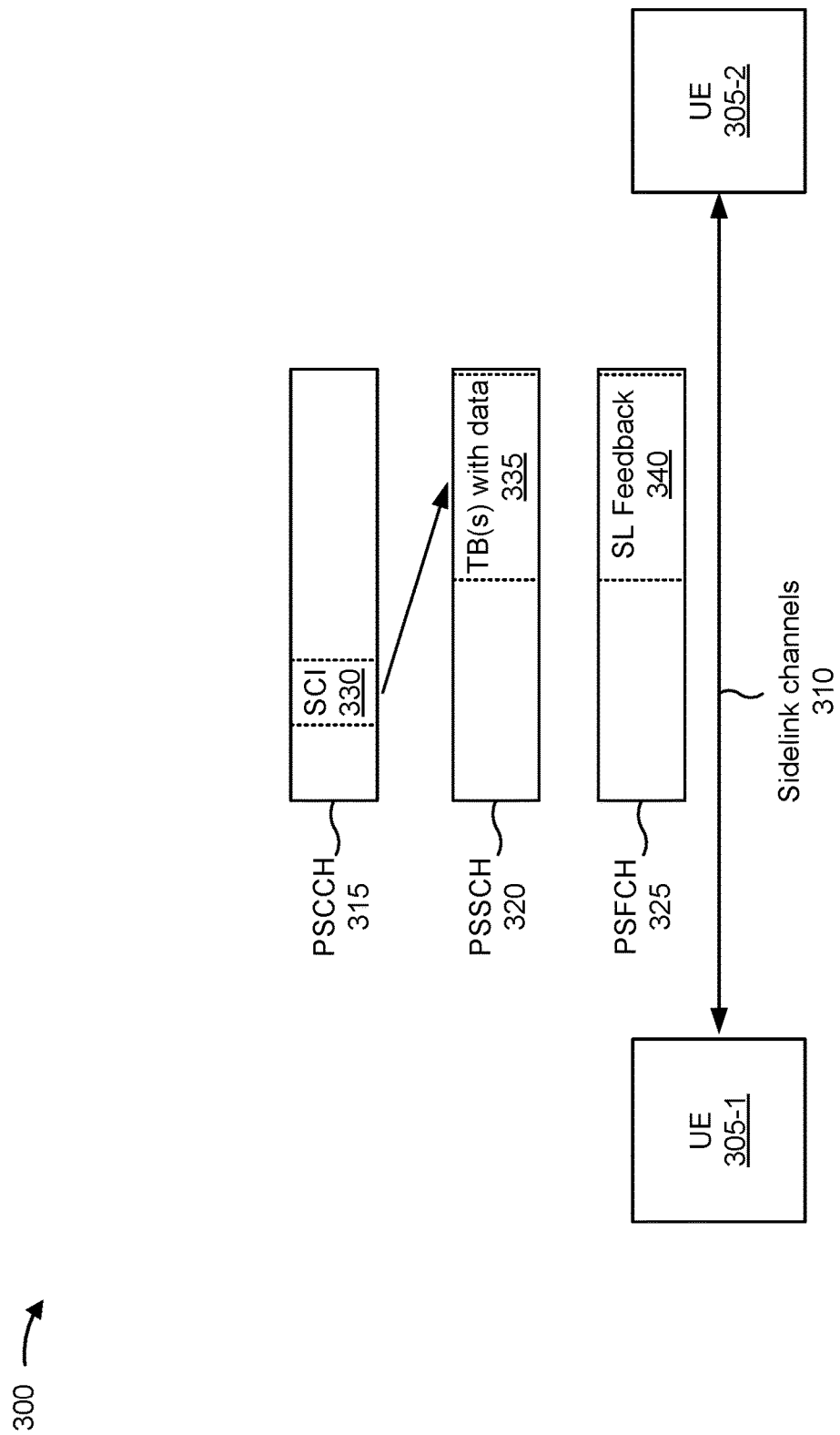
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, V2P communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a PUCCH used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as HARQ feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode, known as sidelink mode 2, where resource selection and/or scheduling is performed by the UE 305 (e.g., rather than a base station 110 in sidelink mode 1). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode (sidelink mode 2) where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
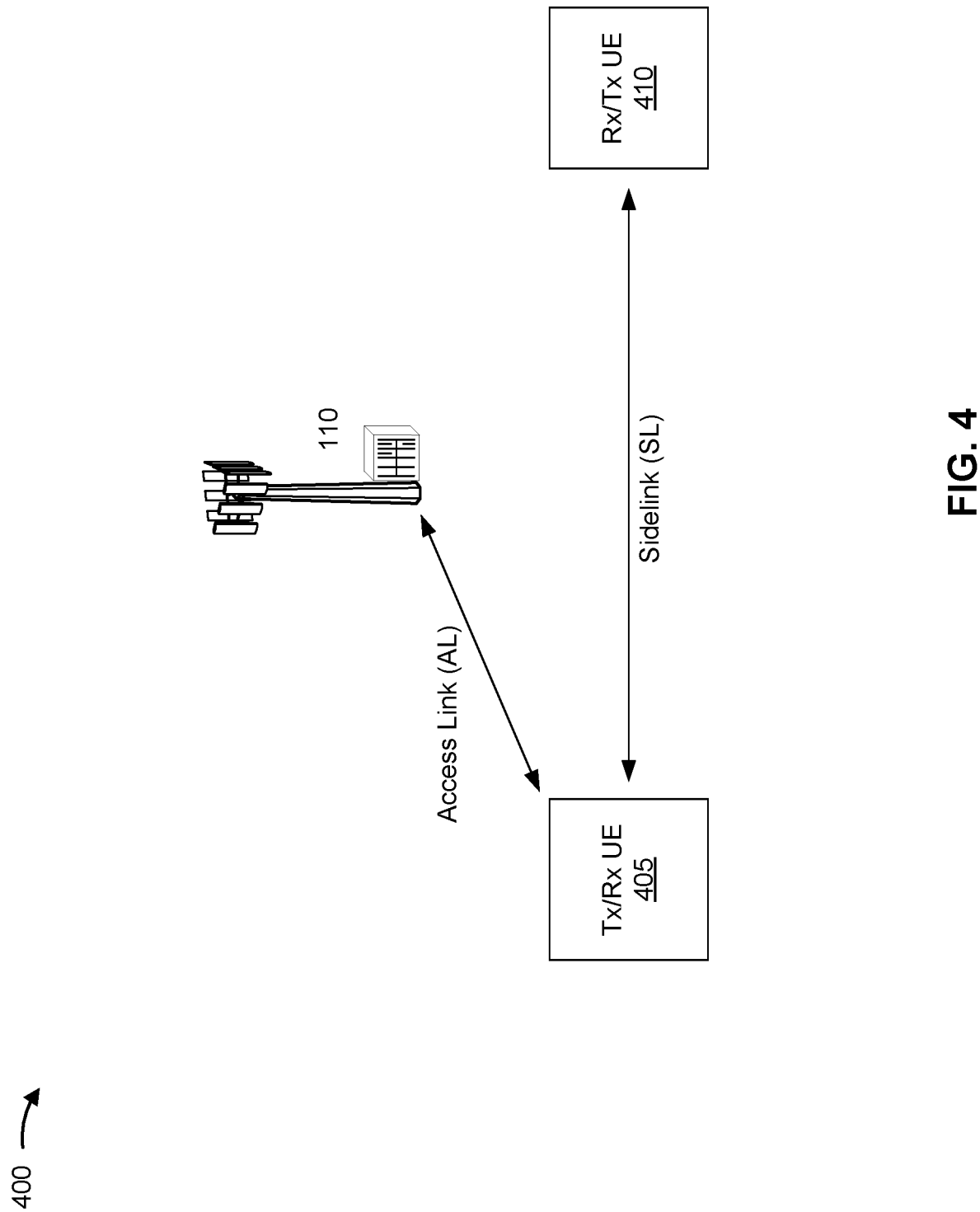
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, such as sidelink mode 1, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. A direct link between UEs 405 and 410 (e.g., via a PC5 interface) may be referred to as a sidelink, and a direct link between a base station 110 and a UE 405 (e.g., via a Uu interface) may be referred to as an access link. Sidelink communications may be transmitted via the sidelink, and access link communications may be transmitted via the access link. An access link communication may be either a downlink communication (from base station 110 to UE 405) or an uplink communication (from UE 405 to base station 110). UE 405 may use a type 3 codebook, triggered by a bit added in DCI 1_1, to report an ACK or NACK for all configured HARQ processes for the Uu interface. A type 3 codebook may be used to map data to antennas and/or a physical channel to provide more accurate feedback than type I or type II codebooks. UE 405 may also report an NDI for each HARQ process with the ACK or NACK.

In sidelink mode 1, base station 110 specifies resources, via DCI on the access link, for UE 405 to use for transmitting a sidelink communication to UE 410 on the sidelink. Base station 110 may transmit DCI to schedule the sidelink communication and indicate a HARQ feedback report timing (e.g., timing value k for a time duration between receiving DCI and transmitting HARQ feedback). Base station 110 may indicate a resource indicator for a PSFCH resource, and the sidelink HARQ feedback that is reported by UE 405 may depend on the PSFCH resource specified by base station 110. Base station 110 may configure a type 1 sidelink configured grant (CG) and transmit a radio resource control (RRC) parameter that includes a parameter (e.g., sl-ACKtoUL-ACK) to indicate a timing for the sidelink HARQ feedback. Base station 110 may configure type 2 sidelink CG, and activation DCI 3_0 may provide the timing for the sidelink HARQ feedback. UE 410 may send sidelink HARQ feedback (ACK or NACK) for a sidelink communication to UE 405, and UE 405 may report the sidelink HARQ feedback to base station 110. The sidelink HARQ feedback may be multiplexed into a codebook that is reported on a PUCCH or a PUSCH. However, if there is a collision between sidelink HARQ feedback, an uplink communication (e.g., on a Uu interface), and/or HARQ feedback for the uplink communication, there is a mechanism to drop the sidelink HARQ feedback, the uplink communication, and/or the HARQ feedback for the Uu interface.

The mechanism for dropping a communication or HARQ feedback may involve prioritizing the sidelink HARQ feedback, the uplink communication, and/or the HARQ feedback for the uplink communication. A priority value of 0 indicates a highest priority, and 1 indicates a next highest priority. If an uplink communication with a priority value of 1 is to be transmitted, such as for ultra-reliable low-latency communication (URLLC), UE 405 may transmit the sidelink HARQ feedback if a priority value of the sidelink HARQ feedback is lower (higher priority) than a certain threshold for URLLC (e.g., sl-PriorityThresholdULURLLC). Otherwise, UE 405 may transmit the uplink communication and drop the sidelink HARQ feedback. A priority value of 1 for an uplink communication is a higher priority than a priority value of 2 for the sidelink HARQ feedback. UE 405 may determine to transmit an uplink communication with a priority value of 0 for enhanced mobile broadband (eMBB). If the sidelink HARQ feedback has a lower priority value than a sidelink priority threshold (e.g., sl-PriorityThreshold), UE 405 may transmit the sidelink HARQ feedback. Otherwise, UE 405 may transmit an uplink communication with a priority value of 0. In sum, base station 110 may use an RRC configuration to prioritize between an uplink transmission/HARQ feedback (URLLC or eMBB) on the PUCCH/PUSCH and sidelink HARQ feedback on the PUCCH. In some configurations, UE 405 may drop the sidelink HARQ feedback. If the sidelink HARQ feedback is dropped (not transmitted as scheduled), base station 110 may not receive sidelink HARQ feedback about whether a sidelink communication was successfully received and decoded. If the sidelink HARQ feedback is never retransmitted, base station 110 may not know that sidelink communications (in sidelink mode 1) transmitted by UE 405 to UE 410 are failing, and communications may degrade. As a result, UE 405 may waste power, processing resources, and signaling resources on transmitting sidelink resources that are failing.

As indicated above, FIG. 4 is provided as an example. Other examples may differ from what is described with respect to FIG. 4.

Figure 5:
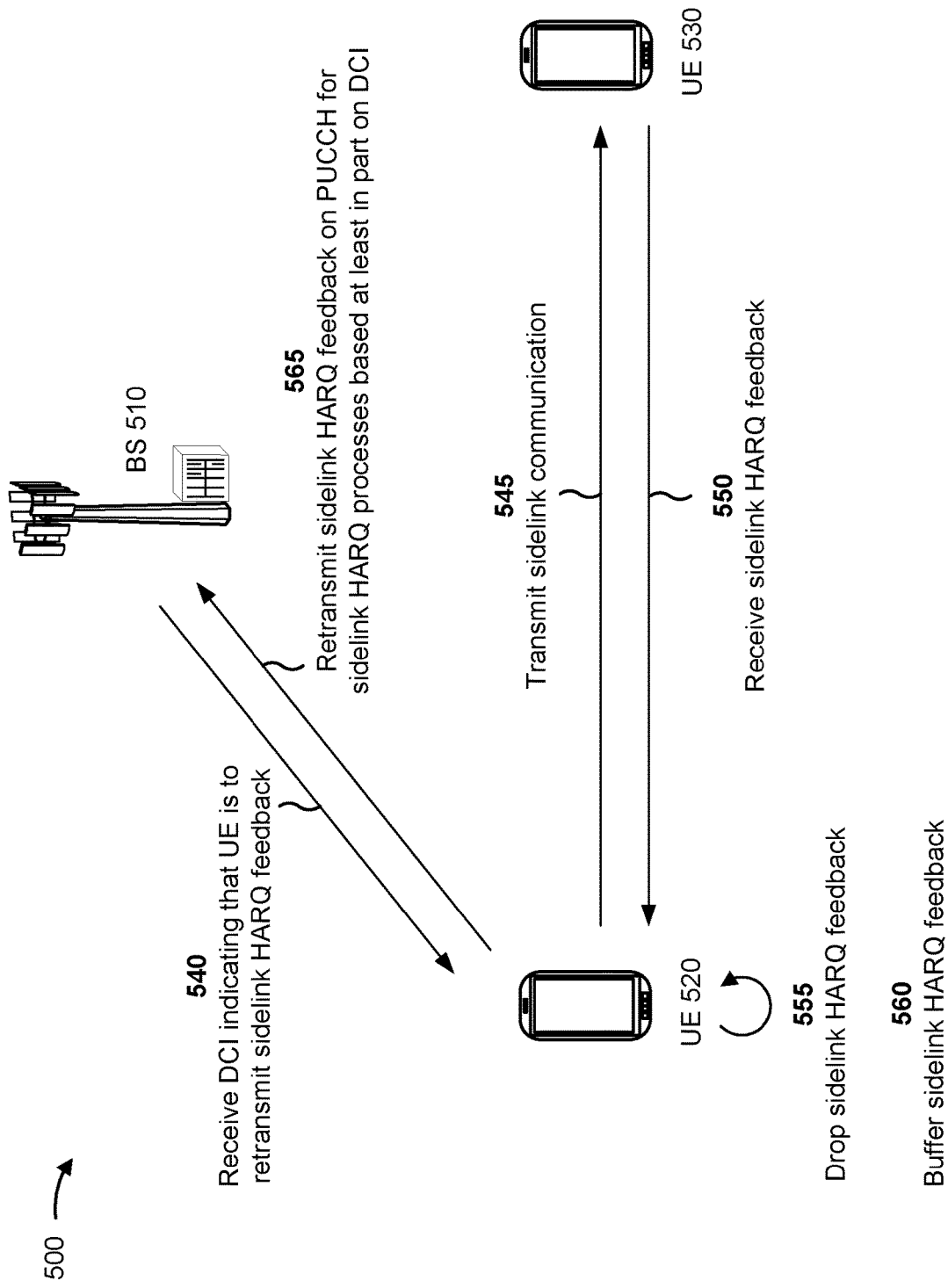
FIG. 5 is a diagram illustrating an example of hybrid automatic repeat request codebook enhancement for sidelink mode 1, in accordance with the present disclosure.

FIG. 5 is a diagram illustrating an example 500 of HARQ codebook enhancement for sidelink mode 1, in accordance with the present disclosure. As shown in FIG. 5, example 500 includes communications between BS 510 (e.g., a BS 110 depicted in FIGS. 1 and 2) and a UE 520 (e.g., a UE 120 depicted in FIGS. 1 and 2). In some aspects, BS 510 and UE 520 may be included in a wireless network, such as wireless network 100. BS 510 and UE 520 may communicate on a wireless access link, which may include an uplink and a downlink on a Uu interface. FIG. 5 also shows that UE 520 may communicate on a sidelink with UE 530 in sidelink mode 1, where BS 510 specifies a sidelink channel resource for transmitting a sidelink communication.

According to various aspects described herein, a UE may recover dropped sidelink HARQ feedback by retransmitting the sidelink HARQ feedback. For example, a base station may indicate in DCI that the UE is to retransmit sidelink HARQ feedback, by including one or more bits in DCI format 3_0 to trigger sidelink HARQ feedback retransmission. The UE may multiplex ACK or NACK for each of one or more HARQ processes for sidelink communications on the sidelink into a sidelink HARQ ACK codebook and retransmit the sidelink HARQ ACK codebook to the base station that is scheduling the sidelink communications. The base station may make scheduling adjustments for sidelink communications according to the sidelink HARQ feedback. As a result, the UE conserves power, processing resources, and signaling resources that would otherwise be wasted by transmitting sidelink communications that are failing.

As shown by reference number 540, UE 520 receives DCI indicating that UE 520 is to retransmit sidelink HARQ feedback. The DCI may include a bit in DCI format 3_0 to trigger sidelink HARQ feedback retransmission. BS 510 may configure UE 520 to transmit an NDI for each corresponding HARQ process.

The sidelink HARQ ACK codebook may be a type 3 codebook that is separately configured from any type 3 HARQ ACK codebook for a Uu interface. The type 3 codebook may have a same priority value as a lowest priority value across all HARQ processes. In some aspects, the DCI may not include a valid sidelink resource grant such that the DCI is used primarily for indicating that UE 520 is only to report type 3 codebooks. The DCI that is used only to signal type 3 codebook reporting may use a special combination of a frequency domain resource assignment (FDRA) field in the DCI (e.g., field is all 1's). The DCI may also indicate a timing value k for a time duration between the DCI and the sidelink HARQ feedback. Using a type 3 codebook for retransmitting sidelink HARQ feedback is a codebook enhancement for sidelink HARQ in sidelink mode 1 that provides more reliability for sidelink communications.

Example 500 involves sidelink mode 1 and thus BS 510 may configure UE 520 for CG sidelink transmissions or use DCI to schedule UE 520 to use a physical sidelink channel resource to transmit a sidelink communication. As shown by reference number 545, UE 520 may transmit the sidelink communication. UE 530 may determine whether the sidelink communication is successful. If so, UE 530 may transmit a HARQ ACK as sidelink HARQ feedback to UE 520. Otherwise, UE 530 may transmit a HARQ NACK as the sidelink HARQ feedback to UE 520. The ACK or NACK may be multiplexed into a sidelink HARQ codebook. As shown by reference number 550, UE 520 may receive the sidelink HARQ feedback.

In some scenarios, BS 510 may not receive the sidelink HARQ feedback from UE 520. UE 520 may have transmitted the sidelink HARQ feedback to BS 510, but BS 510 did not receive the sidelink HARQ feedback. In some scenarios, UE 520 may have dropped the sidelink HARQ feedback, as shown by reference number 555, due to a higher priority communication. As shown by reference number 560, UE 520 may buffer the sidelink HARQ feedback for later retransmission. Based at least in part on the DCI indicating sidelink HARQ retransmission, UE 520 may retransmit the sidelink HARQ feedback to BS 510, as shown by reference number 565. UE 520 may transmit the sidelink HARQ feedback multiplexed in a sidelink HARQ ACK codebook, which may be a type 3 codebook.

In some aspects, UE 520 may transmit the sidelink HARQ feedback with HARQ feedback for the Uu interface (for communications on a physical channel between BS 510 and UE 520). For example, the sidelink HARQ feedback may be concatenated or multiplexed with the HARQ feedback for the Uu interface in a HARQ ACK codebook, which may be a type 3 codebook for the Uu interface. The transmission of the HARQ ACK codebook for the Uu interface may be triggered by a bit in DCI 1_1. The HARQ feedback for the Uu interface may be for HARQ processes for multiple component carriers (CCs), such as for all CCs, and the sidelink HARQ feedback may be for one or more HARQ processes over one or more sidelink CCs.

BS 510 may use RRC parameters for type 3 HARQ codebook control to indicate that UE 520 is to include the sidelink HARQ feedback in the HARQ ACK codebook with the HARQ feedback for the Uu interface. UE 520 may separately control inclusion of NDIs for sidelink or jointly use NDI inclusion for Uu interface HARQ processes. That is, an NDI may indicate each sidelink HARQ process and/or each Uu interface HARQ process. The sidelink HARQ feedback may be treated as if the sidelink HARQ feedback was HARQ feedback for a different Uu interface in a scenario with carrier aggregation. Concatenating or multiplexing sidelink HARQ feedback with HARQ feedback for the Uu interface in a type 3 codebook is a codebook enhancement that increases the efficiency of HARQ feedback reporting to BE 510.

As indicated above, FIG. 5 is provided as an example. Other examples may differ from what is described with regard to FIG. 5.

Figure 6:
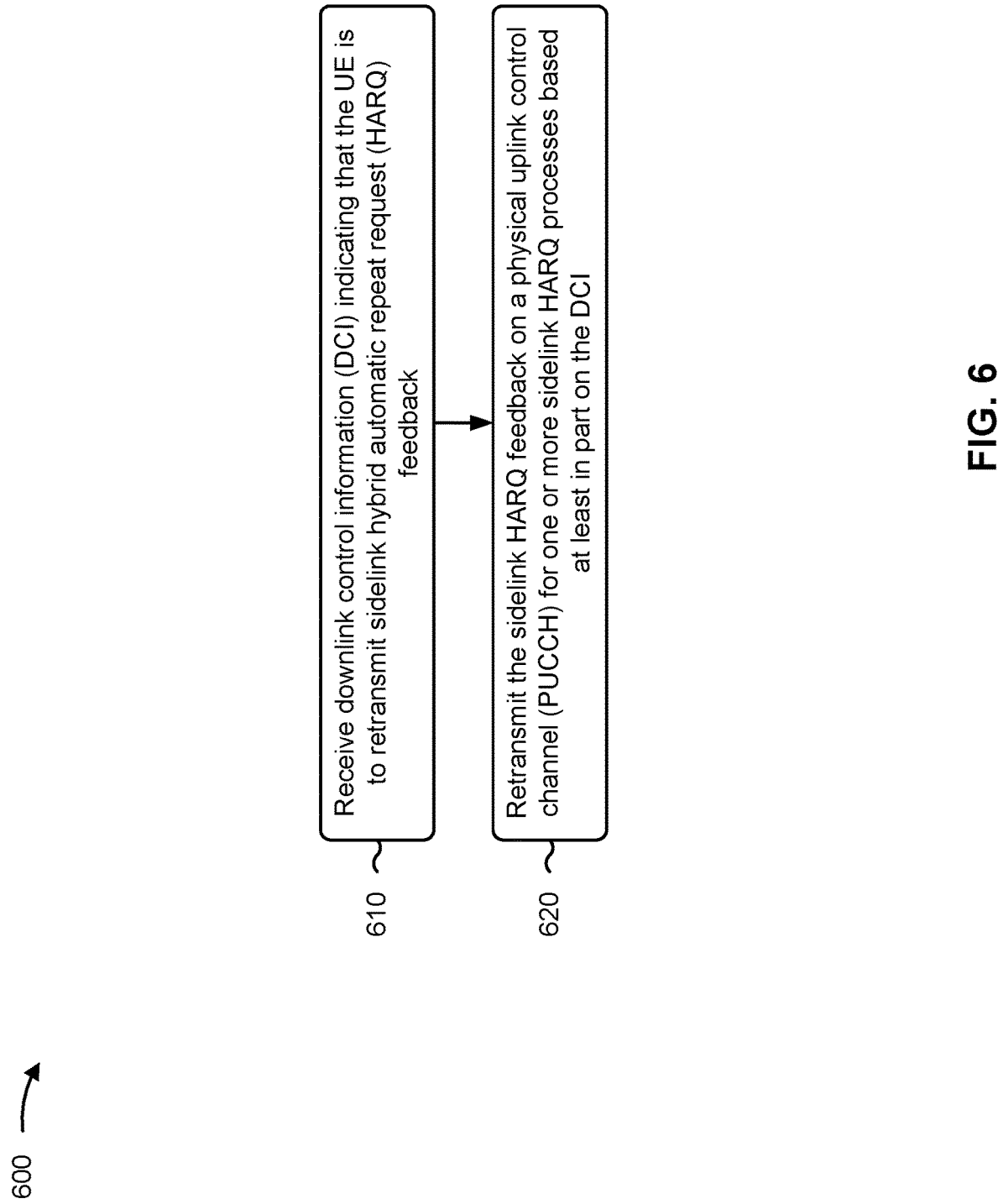
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., UE 120 depicted in FIGS. 1-2, UE 305-1 depicted in FIG. 3, UE 405 depicted in FIG. 4, UE 520 depicted in FIG. 5) performs operations associated with HARQ codebook enhancement for sidelink mode 1.

As shown in FIG. 6, in some aspects, process 600 may include receiving DCI indicating that the UE is to retransmit sidelink HARQ feedback (block 610). For example, the UE (e.g., using reception component 802 depicted in FIG. 8) may receive DCI indicating that the UE is to retransmit sidelink HARQ feedback, as described above.

As further shown in FIG. 6, in some aspects, process 600 may include retransmitting the sidelink HARQ feedback on a PUCCH for one or more sidelink HARQ processes based at least in part on the DCI (block 620). For example, the UE (e.g., using transmission component 804 and/or retransmission component 808 depicted in FIG. 8) may retransmit the sidelink HARQ feedback on a PUCCH for one or more sidelink HARQ processes based at least in part on the DCI, as described above.

Process 600 may include additional aspects, such as any single aspect or any combination of aspects described below and/or in connection with one or more other processes described elsewhere herein.

In a first aspect, the DCI includes a bit in DCI format 3_0 for triggering retransmission of the sidelink HARQ feedback.

In a second aspect, alone or in combination with the first aspect, the sidelink HARQ feedback includes, for each of the one or more sidelink HARQ processes, a HARQ ACK or NACK that is multiplexed into a sidelink HARQ ACK codebook.

In a third aspect, alone or in combination with one or more of the first and second aspects, process 600 includes transmitting an NDI for each corresponding sidelink HARQ process of the one or more sidelink HARQ processes.

In a fourth aspect, alone or in combination with one or more of the first through third aspects, the sidelink HARQ ACK codebook is a type 3 codebook.

In a fifth aspect, alone or in combination with one or more of the first through fourth aspects, a priority of the type 3 codebook is a same priority value as a highest priority across all of the one or more sidelink HARQ processes.

In a sixth aspect, alone or in combination with one or more of the first through fifth aspects, retransmitting the sidelink HARQ feedback includes retransmitting the sidelink HARQ feedback after receiving a trigger in the DCI, without a valid sidelink grant, for reporting only a type 3 codebook.

In a seventh aspect, alone or in combination with one or more of the first through sixth aspects, the trigger for reporting only a type 3 codebook is indicated by a special combination of an FDRA field in the DCI.

In an eighth aspect, alone or in combination with one or more of the first through seventh aspects, retransmitting the sidelink HARQ feedback includes concatenating or multiplexing the sidelink HARQ feedback with HARQ feedback for a Uu interface into a type 3 codebook for the Uu interface, and transmitting the type 3 codebook for the Uu interface.

In a ninth aspect, alone or in combination with one or more of the first through eighth aspects, the DCI is a DCI format 1_1.

In a tenth aspect, alone or in combination with one or more of the first through ninth aspects, the sidelink HARQ feedback is for a plurality of sidelink CCs.

In an eleventh aspect, alone or in combination with one or more of the first through tenth aspects, transmitting the type 3 codebook for the Uu interface with the sidelink HARQ feedback includes transmitting the type 3 codebook for the Uu interface with the sidelink HARQ feedback based at least in part on receiving a parameter for type 3 codebook control in a radio resource control message.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
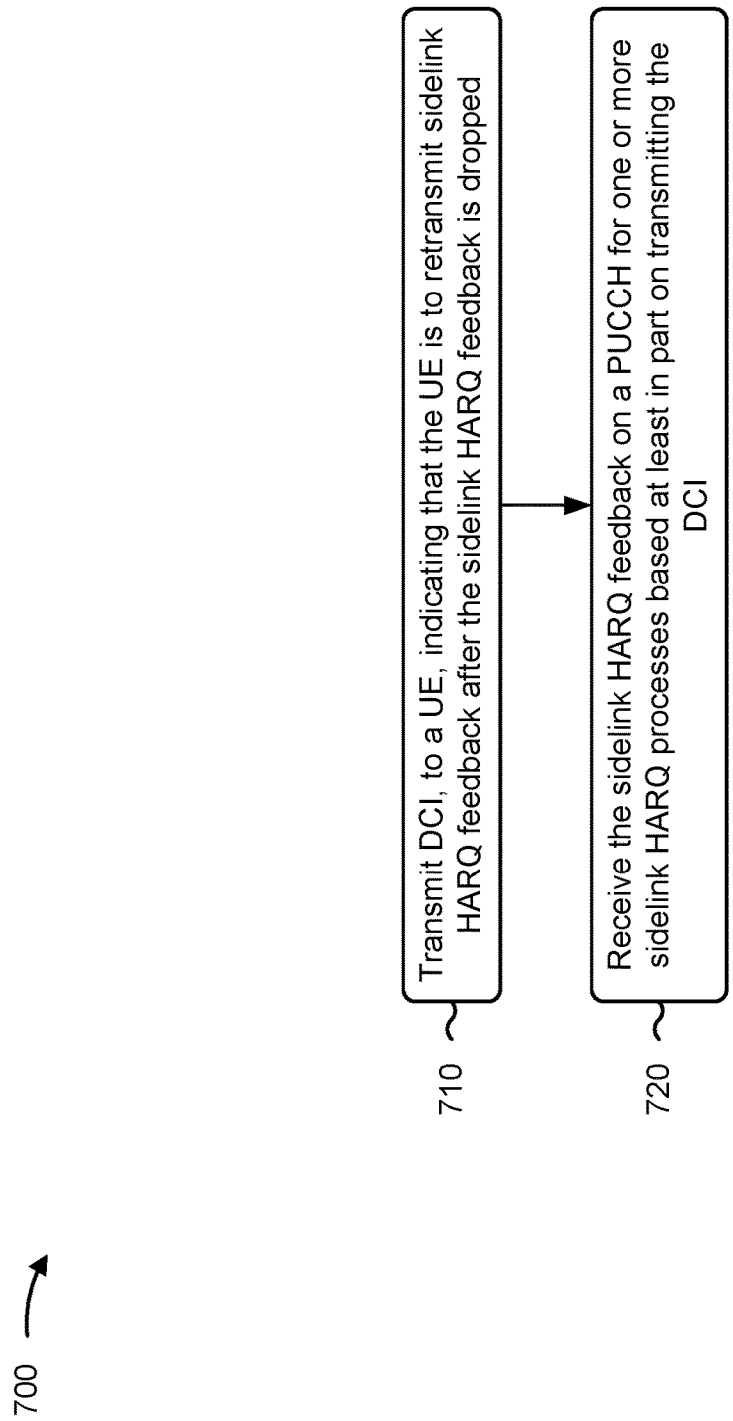
FIG. 7 is a diagram illustrating an example process performed, for example, by a base station, in accordance with the present disclosure.

FIG. 7 is a diagram illustrating an example process 700 performed, for example, by a base station, in accordance with the present disclosure. Example process 700 is an example where the base station (e.g., base station 110 depicted in FIGS. 1-2 and 4, BS 510 depicted in FIG. 5) performs operations associated with hybrid automatic repeat request codebook enhancement for sidelink mode 1.

As shown in FIG. 7, in some aspects, process 700 may include transmitting DCI, to a UE, indicating that the UE is to retransmit sidelink HARQ feedback after the sidelink HARQ feedback is dropped (block 710). For example, the base station (e.g., using transmission component 904 depicted in FIG. 9) may transmit DCI, to a UE, indicating that the UE is to retransmit sidelink HARQ feedback after the sidelink HARQ feedback is dropped, as described above.

As further shown in FIG. 7, in some aspects, process 700 may include receiving the sidelink HARQ feedback on a PUCCH for one or more sidelink HARQ processes based at least in part on transmitting the DCI (block 720). For example, the base station (e.g., using reception component 902 depicted in FIG. 9) may receive the sidelink HARQ feedback on a PUCCH for one or more sidelink HARQ processes based at least in part on transmitting the DCI, as described above.

Process 700 may include additional aspects, such as any single aspect or any combination of aspects described below and/or in connection with one or more other processes described elsewhere herein.

In a first aspect, the DCI includes a bit in a DCI format 3_0 for triggering retransmission of the sidelink HARQ feedback.

In a second aspect, alone or in combination with the first aspect, the sidelink HARQ feedback includes, for each of the one or more sidelink HARQ processes, a HARQ ACK or NACK that is multiplexed into a sidelink HARQ ACK codebook.

In a third aspect, alone or in combination with one or more of the first and second aspects, the sidelink HARQ ACK codebook is a type 3 codebook.

In a fourth aspect, alone or in combination with one or more of the first through third aspects, process 700 includes transmitting, in an FDRA field in the DCI, a trigger for reporting only a type 3 codebook.

In a fifth aspect, alone or in combination with one or more of the first through fourth aspects, receiving the sidelink HARQ feedback includes receiving the sidelink HARQ feedback concatenated or multiplexed with HARQ feedback for a Uu interface in a type 3 codebook for the Uu interface, and the DCI is a DCI format 1_1.

In a sixth aspect, alone or in combination with one or more of the first through fifth aspects, process 700 includes transmitting a parameter for type 3 codebook control in a radio resource control message, where the parameter indicates that the UE is to transmit the sidelink HARQ feedback concatenated or multiplexed with HARQ feedback for a Uu interface in a type 3 codebook for the Uu interface, and receiving the sidelink HARQ feedback includes receiving the sidelink HARQ feedback concatenated or multiplexed with the HARQ feedback for the Uu interface in the type 3 codebook for the Uu interface.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
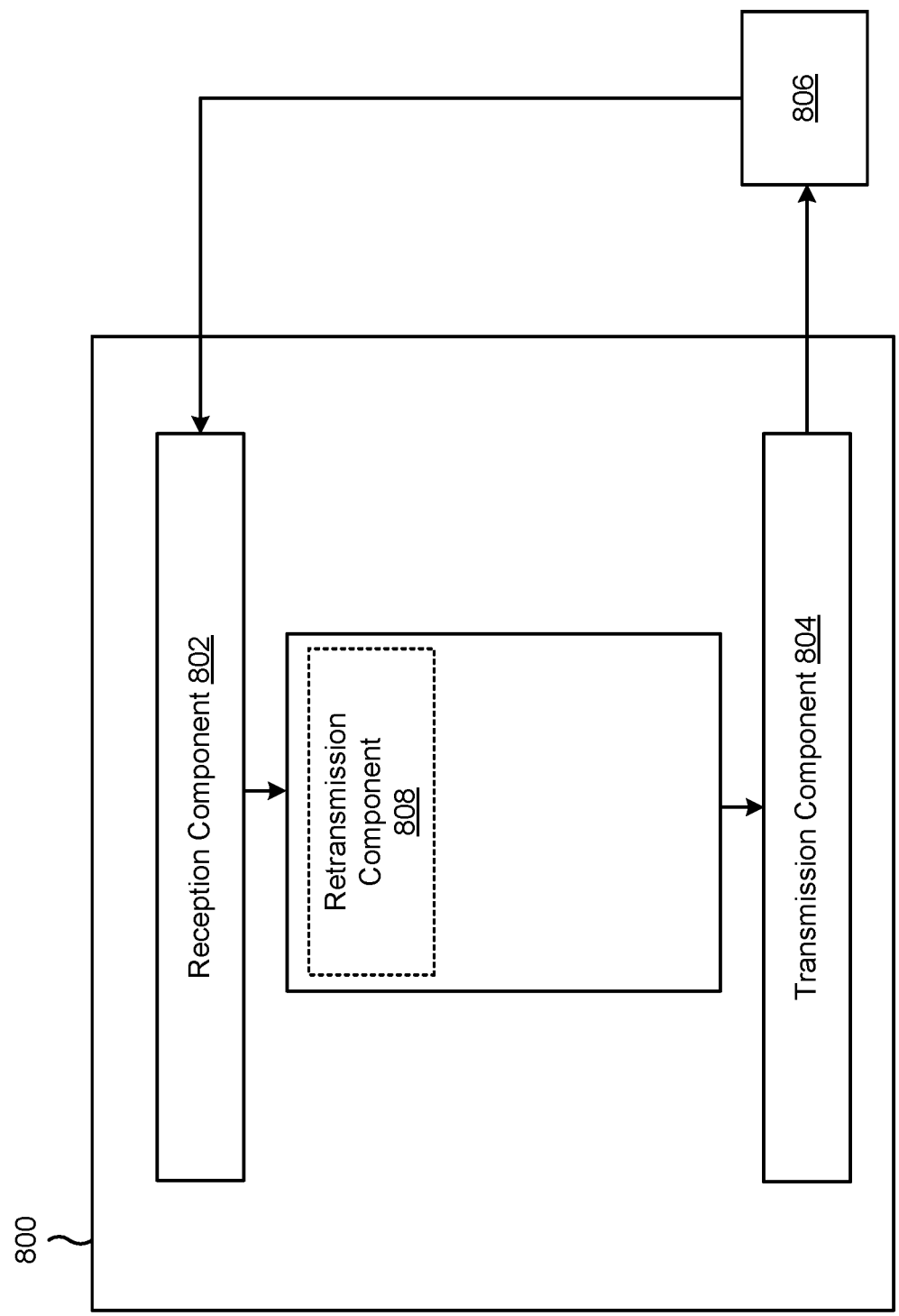
FIGS. 8-9 are block diagrams of example apparatuses for wireless communication, in accordance with the present disclosure.

FIG. 8 is a block diagram of an example apparatus 800 for wireless communication. The apparatus 800 may be a UE (e.g., UE 120, UE 405, UE 520), or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a retransmission component 808, among other examples.

In some aspects, the apparatus 800 may be configured to perform one or more operations described herein in connection with FIGS. 1-5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The reception component 802 may receive DCI indicating that the UE is to retransmit sidelink HARQ feedback. The retransmission component 808 may retransmit the sidelink HARQ feedback on a PUCCH for one or more sidelink HARQ processes based at least in part on the DCI. The retransmission component 808 may include a modulator, a transmit MIMO processor, a transmit processor, a controller/processor, a memory, or a combination thereof, of the UE described above in connection with FIG. 2. The retransmission component 808 may employ transmission component 804. The transmission component 804 may transmit an NDI for each corresponding sidelink HARQ process of the one or more sidelink HARQ processes.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

Figure 9:
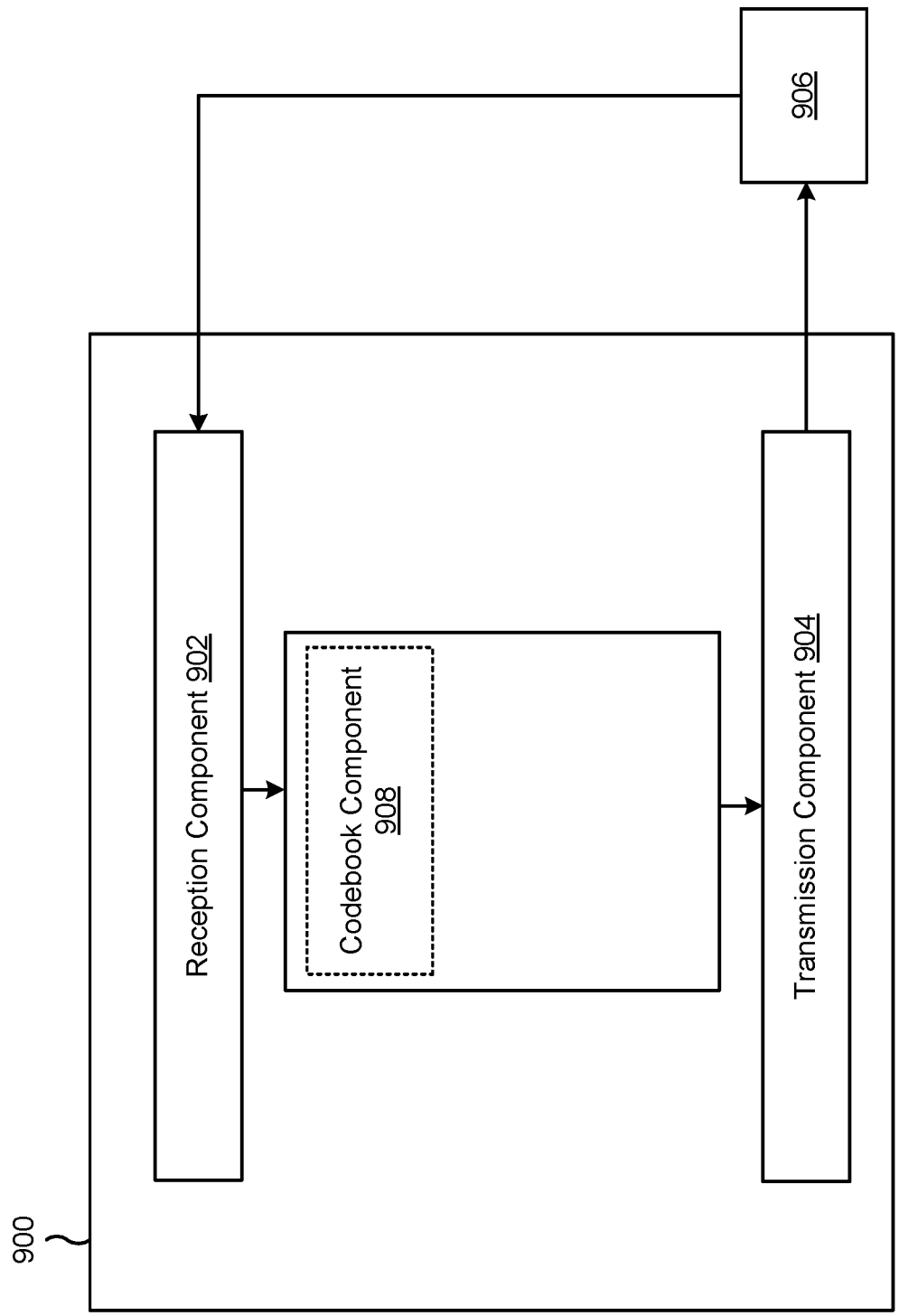

FIG. 9 is a block diagram of an example apparatus 900 for wireless communication. The apparatus 900 may be a base station (e.g., BS 110, BS 510), or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a codebook component 908, among other examples.

In some aspects, the apparatus 900 may be configured to perform one or more operations described herein in connection with FIGS. 1-5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be co-located with the reception component 902 in a transceiver.

The transmission component 904 may transmit DCI, to a UE, indicating that the UE is to retransmit sidelink HARQ feedback after the sidelink HARQ feedback is dropped. The reception component 902 may receive the sidelink HARQ feedback on a PUCCH for one or more sidelink HARQ processes based at least in part on transmitting the DCI.

The codebook component 908 may transmit, in a frequency domain resource assignment field in the DCI, a trigger for reporting only a type 3 codebook. The codebook component 908 may include one or more antennas, a modulator, a transmit MIMO processor, a transmit processor, a controller/processor, a memory, or a combination thereof, of the base station described above in connection with FIG. 2. The codebook component 908 may employ transmission component 904.

The codebook component 908 may transmit a parameter for type 3 codebook control in a radio resource control message, where the parameter indicates that the UE is to transmit the sidelink HARQ feedback concatenated or multiplexed with HARQ feedback for a Uu interface in a type 3 codebook for the Uu interface, and the reception component 902 may receive the sidelink HARQ feedback concatenated or multiplexed with the HARQ feedback for the Uu interface in the type 3 codebook for the Uu interface.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving downlink control information (DCI) indicating that the UE is to retransmit sidelink hybrid automatic repeat request (HARQ) feedback; and retransmitting the sidelink HARQ feedback on a physical uplink control channel (PUCCH) for one or more sidelink HARQ processes based at least in part on the DCI.

Aspect 2: The method of Aspect 1, wherein the DCI includes a bit in DCI format 3_0 for triggering retransmission of the sidelink HARQ feedback.

Aspect 3: The method of Aspect 1 or 2, wherein the sidelink HARQ feedback includes, for each of the one or more sidelink HARQ processes, a HARQ acknowledgement (ACK) or negative acknowledgement (NACK) that is multiplexed into a sidelink HARQ ACK codebook.

Aspect 4: The method of Aspect 3, further comprising transmitting a new data indicator for each corresponding sidelink HARQ process of the one or more sidelink HARQ processes.

Aspect 5: The method of Aspect 3 or 4, wherein the sidelink HARQ ACK codebook is a type 3 codebook.

Aspect 6: The method of Aspect 5, wherein a priority of the type 3 codebook is a same priority value as a highest priority across all of the one or more sidelink HARQ processes.

Aspect 7: The method of Aspect 5 or 6, wherein retransmitting the sidelink HARQ feedback includes retransmitting the sidelink HARQ feedback after receiving a trigger in the DCI, without a valid sidelink grant, for reporting only a type 3 codebook.

Aspect 8: The method of Aspect 7, wherein the trigger for reporting only a type 3 codebook is indicated by a special combination of a frequency domain resource assignment field in the DCI.

Aspect 9: The method of any of Aspects 1-8, wherein retransmitting the sidelink HARQ feedback includes concatenating or multiplexing the sidelink HARQ feedback with HARQ feedback for a Uu interface into a type 3 codebook for the Uu interface, and transmitting the type 3 codebook for the Uu interface.

Aspect 10: The method of Aspect 9, wherein the DCI is a DCI format 1_1.

Aspect 11: The method of Aspect 9 or 10, wherein the sidelink HARQ feedback is for a plurality of sidelink component carriers (CCs).

Aspect 12: The method of any of Aspects 9-11, wherein transmitting the type 3 codebook for the Uu interface with the sidelink HARQ feedback includes transmitting the type 3 codebook for the Uu interface with the sidelink HARQ feedback based at least in part on receiving a parameter for type 3 codebook control in a radio resource control message.

Aspect 13: A method of wireless communication performed by a base station, comprising: transmitting downlink control information (DCI), to a user equipment (UE), indicating that the UE is to retransmit sidelink hybrid automatic repeat request (HARQ) feedback after the sidelink HARQ feedback is dropped; and receiving the sidelink HARQ feedback on a physical uplink control channel (PUCCH) for one or more sidelink HARQ processes based at least in part on transmitting the DCI.

Aspect 14: The method of Aspect 13, wherein the DCI includes a bit in a DCI format 3_0 for triggering retransmission of the sidelink HARQ feedback.

Aspect 15: The method of Aspect 13 or 14, wherein the sidelink HARQ feedback includes, for each of the one or more sidelink HARQ processes, a HARQ acknowledgement (ACK) or negative acknowledgement (NACK) that is multiplexed into a sidelink HARQ ACK codebook.

Aspect 16: The method of Aspect 15, wherein the sidelink HARQ ACK codebook is a type 3 codebook.

Aspect 17: The method of Aspect 16, further comprising transmitting, in a frequency domain resource assignment field in the DCI, a trigger for reporting only a type 3 codebook.

Aspect 18: The method of Aspect 16 or 17, wherein receiving the sidelink HARQ feedback includes receiving the sidelink HARQ feedback concatenated or multiplexed with HARQ feedback for a Uu interface in a type 3 codebook for the Uu interface, and wherein the DCI is a DCI format 1_1.

Aspect 19: The method of any of Aspects 16-18, further comprising transmitting a parameter for type 3 codebook control in a radio resource control message, wherein the parameter indicates that the UE is to transmit the sidelink HARQ feedback concatenated or multiplexed with HARQ feedback for a Uu interface in a type 3 codebook for the Uu interface, wherein receiving the sidelink HARQ feedback includes receiving the sidelink HARQ feedback concatenated or multiplexed with the HARQ feedback for the Uu interface in the type 3 codebook for the Uu interface.

Aspect 20: An apparatus for wireless communication at a device, comprising a processor; memory coupled with the processor; and instructions stored in the memory and executable by the processor to cause the apparatus to perform the method of one or more of Aspects 1-19.

Aspect 21: A device for wireless communication, comprising a memory and one or more processors coupled to the memory, the one or more processors configured to perform the method of one or more of Aspects 1-19.

Aspect 22: An apparatus for wireless communication, comprising at least one means for performing the method of one or more of Aspects 1-19.

Aspect 23: A non-transitory computer-readable medium storing code for wireless communication, the code comprising instructions executable by a processor to perform the method of one or more of Aspects 1-19.

Aspect 24: A non-transitory computer-readable medium storing a set of instructions for wireless communication, the set of instructions comprising one or more instructions that, when executed by one or more processors of a device, cause the device to perform the method of one or more of Aspects 1-19.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware, firmware, and/or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors coupled to the memory, wherein the one or more processors are configured to:
    receive downlink control information (DCI) indicating that the UE is to retransmit sidelink hybrid automatic repeat request (HARQ) feedback after the sidelink HARQ feedback for a sidelink communication is dropped; and
    retransmit, after the sidelink HARQ feedback for the sidelink communication is dropped, the sidelink HARQ feedback for the sidelink communication on a physical uplink control channel (PUCCH) for one or more sidelink HARQ processes based at least in part on the DCI.

2. The UE of claim 1, wherein the DCI includes a bit in DCI format 3_0 for triggering retransmission of the sidelink HARQ feedback.

3. The UE of claim 1, wherein the sidelink HARQ feedback includes, for each of the one or more sidelink HARQ processes, a HARQ acknowledgement (ACK) or negative acknowledgement (NACK) that is multiplexed into a sidelink HARQ ACK codebook.

4. The UE of claim 3, wherein the one or more processors are configured to transmit a new data indicator for each corresponding sidelink HARQ process of the one or more sidelink HARQ processes.

5. The UE of claim 3, wherein the sidelink HARQ ACK codebook is a type 3 codebook.

6. The UE of claim 5, wherein a priority of the type 3 codebook is a same priority value as a highest priority across all of the one or more sidelink HARQ processes.

7. The UE of claim 5, wherein the one or more processors, to retransmit the sidelink HARQ feedback, are configured to retransmit the sidelink HARQ feedback after receiving a trigger in the DCI that does not include a valid sidelink grant, the trigger being for reporting only a type 3 codebook.

8. The UE of claim 7, wherein the trigger for reporting only a type 3 codebook is indicated by a special combination of a frequency domain resource assignment field in the DCI.

9. The UE of claim 1, wherein the one or more processors, to retransmit the sidelink HARQ feedback, are configured to concatenate or multiplex the sidelink HARQ feedback with HARQ feedback for a Uu interface into a type 3 codebook for the Uu interface, and transmit the type 3 codebook for the Uu interface.

10. The UE of claim 9, wherein the DCI is a DCI format 1_1.

11. The UE of claim 9, wherein the sidelink HARQ feedback is for a plurality of sidelink component carriers (CCs).

12. The UE of claim 9, wherein the one or more processors, to transmit the type 3 codebook for the Uu interface with the sidelink HARQ feedback, are configured to transmit the type 3 codebook for the Uu interface with the sidelink HARQ feedback based at least in part on a parameter for type 3 codebook control received in a radio resource control message.

13. A network entity for wireless communication, comprising:
a memory; and
one or more processors coupled to the memory, wherein the one or more processors are configured to:
transmit downlink control information (DCI), to a user equipment (UE), indicating that the UE is to retransmit sidelink hybrid automatic repeat request (HARQ) feedback for a sidelink communication after the sidelink HARQ feedback for the sidelink communication is dropped; and
receive the sidelink HARQ feedback on a physical uplink control channel (PUCCH) for one or more sidelink HARQ processes based at least in part on transmitting the DCI.

14. The network entity of claim 13, wherein the DCI includes a bit in a DCI format 3_0 for triggering retransmission of the sidelink HARQ feedback.

15. The network entity of claim 13, wherein the sidelink HARQ feedback includes, for each of the one or more sidelink HARQ processes, a HARQ acknowledgement (ACK) or negative acknowledgement (NACK) that is multiplexed into a sidelink HARQ ACK codebook.

16. The network entity of claim 15, wherein the sidelink HARQ ACK codebook is a type 3 codebook.

17. The network entity of claim 16, wherein the one or more processors are configured to transmit, in a frequency domain resource assignment field in the DCI, a trigger for reporting only a type 3 codebook.

18. The network entity of claim 16, wherein the one or more processors, to receive the sidelink HARQ feedback, are configured to receive the sidelink HARQ feedback concatenated or multiplexed with HARQ feedback for a Uu interface in a type 3 codebook for the Uu interface, and wherein the DCI is a DCI format 1_1.

19. The network entity of claim 16, wherein the one or more processors are configured to transmit a parameter for type 3 codebook control in a radio resource control message, wherein the parameter indicates that the UE is to transmit the sidelink HARQ feedback concatenated or multiplexed with HARQ feedback for a Uu interface in a type 3 codebook for the Uu interface, and wherein the one or more processors, to receive the sidelink HARQ feedback, are configured to receive the sidelink HARQ feedback concatenated or multiplexed with the HARQ feedback for the Uu interface in the type 3 codebook for the Uu interface.

20. A method of wireless communication performed by a user equipment (UE), comprising:
receiving downlink control information (DCI) indicating that the UE is to retransmit sidelink hybrid automatic repeat request (HARQ) feedback after the sidelink HARQ feedback for a sidelink communication is dropped; and
retransmitting, after the sidelink HARQ feedback for the sidelink communication is dropped, the sidelink HARQ feedback for the sidelink communication on a physical uplink control channel (PUCCH) for one or more sidelink HARQ processes based at least in part on the DCI.

21. The method of claim 20, wherein the DCI includes a bit in DCI format 3_0 for triggering retransmission of the sidelink HARQ feedback.

22. The method of claim 20, wherein the sidelink HARQ feedback includes, for each of the one or more sidelink HARQ processes, a HARQ acknowledgement (ACK) or negative acknowledgement (NACK) that is multiplexed into a sidelink HARQ ACK codebook, and wherein the sidelink HARQ ACK codebook is a type 3 codebook.

23. The method of claim 22, wherein a priority of the type 3 codebook is a same priority value as a highest priority across all of the one or more sidelink HARQ processes.

24. The method of claim 20, wherein retransmitting the sidelink HARQ feedback includes retransmitting the sidelink HARQ feedback after receiving a trigger in the DCI, without a valid sidelink grant, for reporting only a type 3 codebook.

25. The method of claim 20, wherein retransmitting the sidelink HARQ feedback includes concatenating or multiplexing the sidelink HARQ feedback with HARQ feedback for a Uu interface into a type 3 codebook for the Uu interface, and transmitting the type 3 codebook for the Uu interface.

26. A method of wireless communication performed by a network entity, comprising:
transmitting downlink control information (DCI), to a user equipment (UE), indicating that the UE is to retransmit sidelink hybrid automatic repeat request (HARQ) feedback for a sidelink communication after the sidelink HARQ feedback for the sidelink communication is dropped; and
receiving the sidelink HARQ feedback on a physical uplink control channel (PUCCH) for one or more sidelink HARQ processes based at least in part on transmitting the DCI.

27. The method of claim 26, wherein the DCI includes a bit in a DCI format 3_0 for triggering retransmission of the sidelink HARQ feedback, wherein the sidelink HARQ feedback includes, for each of the one or more sidelink HARQ processes, a HARQ acknowledgement (ACK) or negative acknowledgement (NACK) that is multiplexed into a sidelink HARQ ACK codebook, and wherein the sidelink HARQ ACK codebook is a type 3 codebook.

28. The method of claim 26, further comprising transmitting, in a frequency domain resource assignment field in the DCI, a trigger for reporting only a type 3 codebook.

29. The method of claim 26, wherein receiving the sidelink HARQ feedback includes receiving the sidelink HARQ feedback concatenated or multiplexed with HARQ feedback for a Uu interface in a type 3 codebook for the Uu interface, and wherein the DCI is a DCI format 1_1.

30. The method of claim 26, further comprising transmitting a parameter for type 3 codebook control in a radio resource control message, wherein the parameter indicates that the UE is to transmit the sidelink HARQ feedback concatenated or multiplexed with HARQ feedback for a Uu interface in a type 3 codebook for the Uu interface, wherein receiving the sidelink HARQ feedback includes receiving the sidelink HARQ feedback concatenated or multiplexed with the HARQ feedback for the Uu interface in the type 3 codebook for the Uu interface.

\* \* \* \* \*